US012663640B2

(12) United States Patent
Takahashi et al.

(10) Patent No.: US 12,663,640 B2
(45) Date of Patent: Jun. 23, 2026

(54) HEAD-UP DISPLAY SYSTEM AND OPTICAL FUNCTIONAL LAYER FOR HEAD-UP DISPLAY

(71) Applicant: NIPPON KAYAKU KABUSHIKI KAISHA, Tokyo (JP)

(72) Inventors: Chihiro Takahashi, Tokyo (JP); Yoshihiko Taira, Tokyo (JP); Mitsunori Nakamura, Tokyo (JP); Tomoyuki Hayasaki, Tokyo (JP); Yoshiyuki Yahagi, Tokyo (JP)

(73) Assignee: NIPPON KAYAKU KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/076,217

(22) Filed: Mar. 11, 2025

(65) Prior Publication Data

US 2025/0208410 A1     Jun. 26, 2025

Related U.S. Application Data

(63) Continuation of application No. PCT/JP2023/033087, filed on Sep. 11, 2023.

(30) Foreign Application Priority Data

Sep. 12, 2022     (JP) ................................. 2022-144553

(51) Int. Cl.
$G02B\ 27/00$     (2006.01)
$G02B\ 5/30$     (2006.01)
$G02B\ 27/01$     (2006.01)

(52) U.S. Cl.
CPC ........... G02B 27/0018 (2013.01); G02B 5/30 (2013.01); G02B 5/3016 (2013.01);
(Continued)

(58) Field of Classification Search
CPC ...... G02B 5/30; G02B 5/3016; G02B 5/3066; G02B 27/0018; G02B 27/01; G02B 27/0101; G02B 2027/0194
See application file for complete search history.

(56) References Cited

U.S. PATENT DOCUMENTS

| | | | |
|---|---|---|---|
| 5,510,913 A | 4/1996 | Hashimoto et al. | |
| 9,946,064 B1 | 4/2018 | Chen | |

(Continued)

FOREIGN PATENT DOCUMENTS

| | | |
|---|---|---|
| JP | H06-040271 A | 2/1994 |
| JP | 2002-090743 A | 3/2002 |

(Continued)

OTHER PUBLICATIONS

International Search Report for corresponding International Application No. PCT/JP2023/033087 mailed Nov. 14, 2023.

(Continued)

*Primary Examiner* — Cory A Almeida
(74) *Attorney, Agent, or Firm* — Chrisman Gallo Tochtrop LLC

(57) ABSTRACT

The present disclosure relates to a head-up display system including image display unit for emitting display light showing a display image, and functional glass on which the image cast from the image display unit is projected. The functional glass includes an optical functional layer exhibiting reverse wavelength dispersibility, the functional glass is disposed at an angle $\alpha$ of 20° or more and 70° or less, and a reflected image is visually confirmed within visual angles of Brewster angle $\beta-(90°-$the angle $\alpha)\pm15°$ to the functional glass.

16 Claims, 3 Drawing Sheets

(52) U.S. Cl.
CPC ........... *G02B 5/3066* (2013.01); *G02B 27/01* (2013.01); *G02B 27/0101* (2013.01); *G02B 2027/0194* (2013.01)

(56) References Cited

U.S. PATENT DOCUMENTS

| | | | |
|---|---|---|---|
| 2004/0263736 A1 | 12/2004 | Graham et al. | |
| 2005/0078245 A1 | 4/2005 | Sasaki et al. | |
| 2007/0018907 A1* | 1/2007 | Koma | G02B 27/0101 345/7 |
| 2009/0153962 A1 | 6/2009 | Okada et al. | |
| 2017/0235030 A1* | 8/2017 | Tanaka | G02B 5/3083 349/11 |
| 2017/0361579 A1 | 12/2017 | Chen et al. | |
| 2017/0361687 A1 | 12/2017 | Chen et al. | |
| 2017/0363863 A1 | 12/2017 | Chen | |
| 2022/0011575 A1 | 1/2022 | Yanai | |
| 2022/0187602 A1* | 6/2022 | Takahashi | B60K 35/22 |
| 2024/0337831 A1 | 10/2024 | Chen | |

FOREIGN PATENT DOCUMENTS

| | | |
|---|---|---|
| JP | 2003-315556 A | 11/2003 |
| JP | 2004-029824 A | 1/2004 |
| JP | 2009-128658 A | 6/2009 |
| JP | 2022-003400 A | 1/2022 |
| WO | 2016/056617 A1 | 4/2016 |
| WO | 2020/203595 A1 | 10/2020 |
| WO | 2021/049295 A1 | 3/2021 |

OTHER PUBLICATIONS

Written Opinion for corresponding International Application No. PCT/JP2023/033087 dated Nov. 14, 2023 and English translation.
International Report on Patentability for corresponding International Application No. PCT/JP2023/033087 dated Mar. 1, 2025.

* cited by examiner

HEAD-UP DISPLAY SYSTEM AND OPTICAL FUNCTIONAL LAYER FOR HEAD-UP DISPLAY

CROSS REFERENCE TO RELATED APPLICATIONS

This is a continuation application of International Patent Application No. PCT/JP2023/033087 filed Sep. 11, 2023, which claims the benefit of Japanese Patent Application No. 2022-144553 filed Sep. 12, 2022, as well as the full contents of all of which are hereby incorporated by reference in their entirety.

BACKGROUND

Technical Field

The present disclosure relates to a head-up display system and an optical functional layer which are suitable to be applied to a head-up display.

Description of the Related Art

A navigation system, a head-up display (hereinafter also referred to as a "HUD"), and the like are used as methods for displaying information to drivers of cars and airplanes. A HUD is a system which projects images cast from image projection units such as a liquid crystal display (hereinafter also referred to as an "LCD"), for example, on a windshield of a car or the like.

Emission light emitted from image display unit is reflected on a reflecting mirror and further reflected on a windshield, and then reaches an observer. Although the observer sees the image projected on the windshield, it appears as if the image were at an image position beyond the windshield. In this method, since the driver can obtain various pieces of information in a state in which the driver gazes ahead of the windshield almost without moving their sight line, a HUD is safer than conventional car navigation systems, in which drivers had to move their sight lines.

A problem was that, although, in a HUD system, display information was projected while being superimposed on a scene actually seen through a windshield, the display light was reflected on the two surfaces inside and outside the windshield, resulting in the reflected image being a double image, and causing the display information to be difficult to see.

With respect to this problem, it is known that the problem of double-image of the reflected image can be improved using a phase difference element which can change a polarization direction by 90° for the windshield for cars. For example, in Japanese Patent Application Laid Open No. H6-40271, it is disclosed that when display light converted into S polarized light comes into a windshield for cars including a film-like optical rotator therein at a Brewster angle, some of the S polarized light is reflected on the inner surface of the windshield of a car, S polarized light transmitted through the surface is converted into P polarized light by an optical rotator, and all of the P polarized light is further emitted from the outer surface of the windshield of the car to outside of the car to prevent a double image.

As different units for suppressing a double image, a technique for letting P polarized come in using a light control film in which a light reflecting film manufactured using a cholesteric liquid crystal layer for reflecting circularly polarized light is clamped with two ¼ wavelength plates is known (International Publication No. WO 2016/056617). In this technique, converting linear polarized light which comes in into circularly polarized light by a ¼ wavelength plate and reflecting the converted circularly polarized light on the light reflecting film manufactured using the cholesteric liquid crystal layer enable an observer to visually confirm the reflected light.

However, if the conversion between S polarized light and P polarized light is not performed very efficiently in such a windshield for cars as described in Japanese Patent Application Laid Open No. H6-40271, or the like, a double image may be formed by S polarized light which returns without being emitted outside a car. Also, in the technique described in International Publication No. WO 2016/056617, it is desirable to convert P polarized light which comes into a ¼ wavelength plate on the inner side of the car into circularly polarized light as efficiently as possible and convert the circularly polarized light which comes into the ¼ wavelength plate on the outer side of the car through the cholesteric liquid crystal layer into P polarized light more efficiently.

SUMMARY

The present disclosure is related to providing a head-up display system and an optical functional layer for a head-up display which have an excellent effect of suppressing the formation of a double image.

A head-up display according to an embodiment of the present disclosure includes image display unit that emits display light showing a display image, and functional glass on which the image cast from the image display unit is projected, the functional glass includes an optical functional layer exhibiting reverse wavelength dispersibility, the functional glass is disposed at an angle α of 20° or more and 70° or less, and a reflected image is visually confirmed within visual angles of Brewster angle β−(90°−the angle α)±15° to the functional glass.

An optical functional layer for a head-up display system according to an embodiment of the present disclosure is provided in the head-up display system.

According to the present disclosure, provided are a head-up display system and an optical functional layer for a head-up display which have an excellent effect of suppressing the formation of a double image.

DETAILED DESCRIPTION

Hereinafter, embodiments according to the present disclosure will be described with reference to the drawings. The following embodiments merely illustrate some typical embodiments of the present disclosure, and various modifications can be added within the scope of the present disclosure. Hereinafter, the expression "for a head-up display" may be omitted, and an optical functional layer for a head-up display, an optical laminate for a head-up display, and functional glass for a head-up display may be described merely as an optical functional layer, an optical laminate, and functional glass, respectively. Terms such as "(meth) acryloyl" and "(meth)acrylate" mean "acryloyl" or "methacryloyl" and "acrylate" or "methacrylate", respectively. A "head-up display" may be expressed as a HUD. A film for a phase difference layer may be expressed as a phase difference film.

Head-Up Display

A head-up display according to an embodiment of the present disclosure includes image display unit that emits display light showing a display image, and functional glass on which the image cast from the image display unit is projected. The functional glass includes an optical functional layer exhibiting reverse wavelength dispersibility, the functional glass is disposed at an angle, of 20° or more and 70° or less, and a reflected image is furthermore confirmed visually within visual angles of Brewster angle β–(90°–the angle α)±15° to the functional glass. The functional glass including an optical functional layer exhibiting reverse wavelength dispersibility can be thus disposed so that a reflected image is visually confirmed at a specific visual angle to suppress the formation of a double image effectively. If the functional glass is applied as windshields for vehicles especially in the head-up display according to the present disclosure, the application of respective optimal visual angles to various angles of the windshields enables suppressing the formation of double images effectively in the various types of cars, and enables viewers to use the head-up display system within a wide angle of view without stress.

Figure 1:
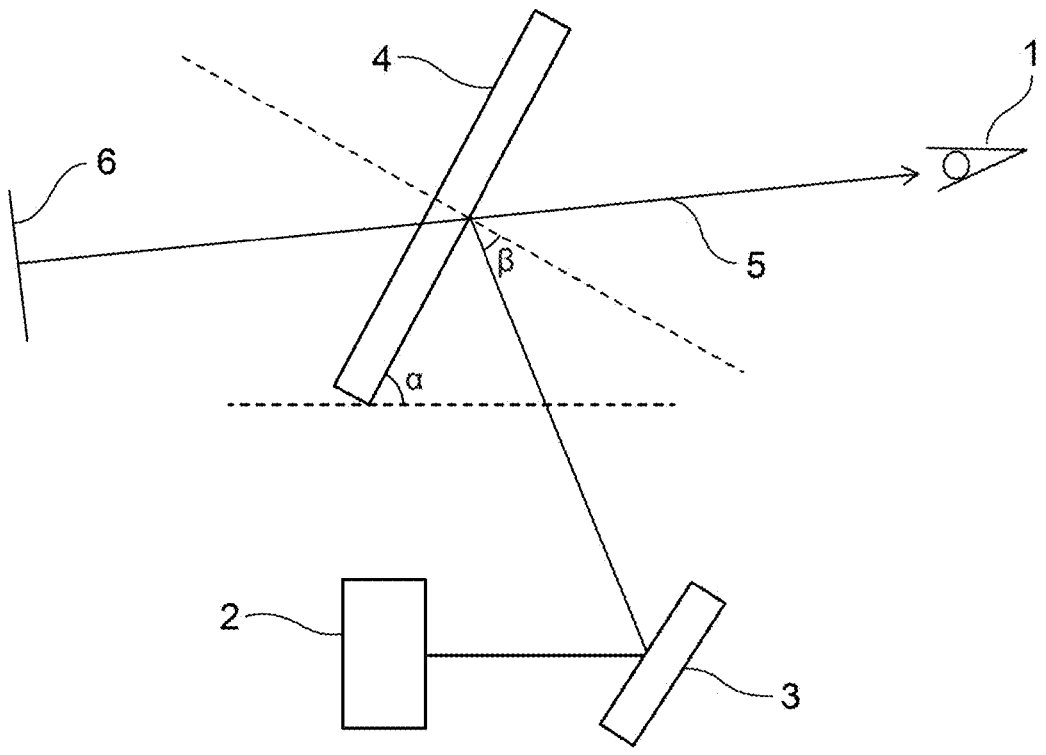
FIG. 1 is a schematic diagram showing one embodiment of a head-up display system according to the present disclosure.

FIG. 1 shows an embodiment of the HUD system of the present disclosure as a schematic diagram. The HUD system shown in FIG. 1 includes image display unit (display) 2 which emits display light showing a display image, a reflecting mirror 3 which reflects the display light emitted from the image display unit 2, and functional glass 4 on which an image cast from the image display unit 2 is projected. The display light emitted from the image display unit 2 is reflected on the reflecting mirror 3, and this reflected display light is projected on the functional glass 4 functioning as a windshield. The cast image reaches an observer 1 through an optical path 5, and the virtual image of the display image 6 can be visually confirmed. Although the display light emitted from the image display unit 2 comes into the functional glass 4 through the reflecting mirror 3 in the HUD system shown in FIG. 1, the display light may come from the image display unit 2 directly into the functional glass 4. The functional glass 4 may be irradiated with desired polarized light to which the polarized light emitted from the image display unit 2 is adjusted by emitting the display light showing the display image from the image display unit 2, reflecting the display light on the reflecting mirror 3, and passing this reflected light through a polarizing plate before this reflected light reaches the functional glass 4.

In an existing head-up display system for projecting a desired image on the windshield, an incidence angle of the projected light including the display image comes into the windshield usually at around 60° or more and 70° or less, and the visual angle at which a reflected image is visually confirmed is set usually downward at a visual angle of around 5° to the horizontal line of sight of the driver. In the HUD system of the present disclosure, the functional glass is disposed at an angle α of 20° or more and 70° or less, and the reflected image is furthermore visually confirmed within visual angles of Brewster angle β–(90°–the angle α)±15° to the functional glass. The angle α at which the functional glass is disposed means that the functional glass is inclined at the angle to a support on which the functional glass is disposed. In the HUD system shown in FIG. 1, the angle α means an angle, α, formed by the functional glass 4 and the broken line contacting the functional glass 4. For example, if the functional glass 4 is a windshield for vehicles, such an angle α is an angle at which the windshield is inclined to the inside of the car. The Brewster angle β means an incidence angle at which the reflectance of the P polarized light is zero upon the incidence of the display light on the surface of the functional glass, and means, in the HUD system shown in FIG. 1, an angle β such that the reflectance of the P polarized light is zero upon the incidence of the display light at the angle to the axis indicated as the broken line and perpendicular to the functional glass 4. Since the light comes from air, having a refractive index of 1, into the glass having a refractive index of around 1.5 in the HUD system of the present disclosure, the Brewster angle β is around 56°.

If the functional glass is disposed at an angle α of 20° or more and 70° or less, the reflected image is visually confirmed within visual angles of Brewster angle β–(90°–the angle α)±15° to the functional glass in the HUD system of the present disclosure. Such a visual angle may be at least one of a value calculated as Brewster angle β–(90°–the angle α) and values calculated as Brewster angle β–(90°–the angle α)±15°. For example, if the functional glass is disposed at an angle, α, of 50°, the visual angle may be at least one of 16°, which is a value calculated as 56°–(90°–50°), and 31° and 1°, which are values calculated as 56°–(90°–50°)±15°.

It is preferable that the functional glass be disposed at an angle α of 25° or more and 70° or less. If the functional glass is disposed in the angle α in this range, the formation of the double image is suppressed in an improved area. It is preferable that the reflected image be visually confirmed within visual angles of Brewster angle β–(90°–the angle α)±10° to the functional glass. If the visual angle is in this range, the formation of a double image can be suppressed in an improved area. Such a visual angle may also be at least one of a value calculated as Brewster angle β–(90°–the angle α) and values calculated as Brewster angle β–(90°–the angle α)±10°.

Image Display Unit

Figure 2:
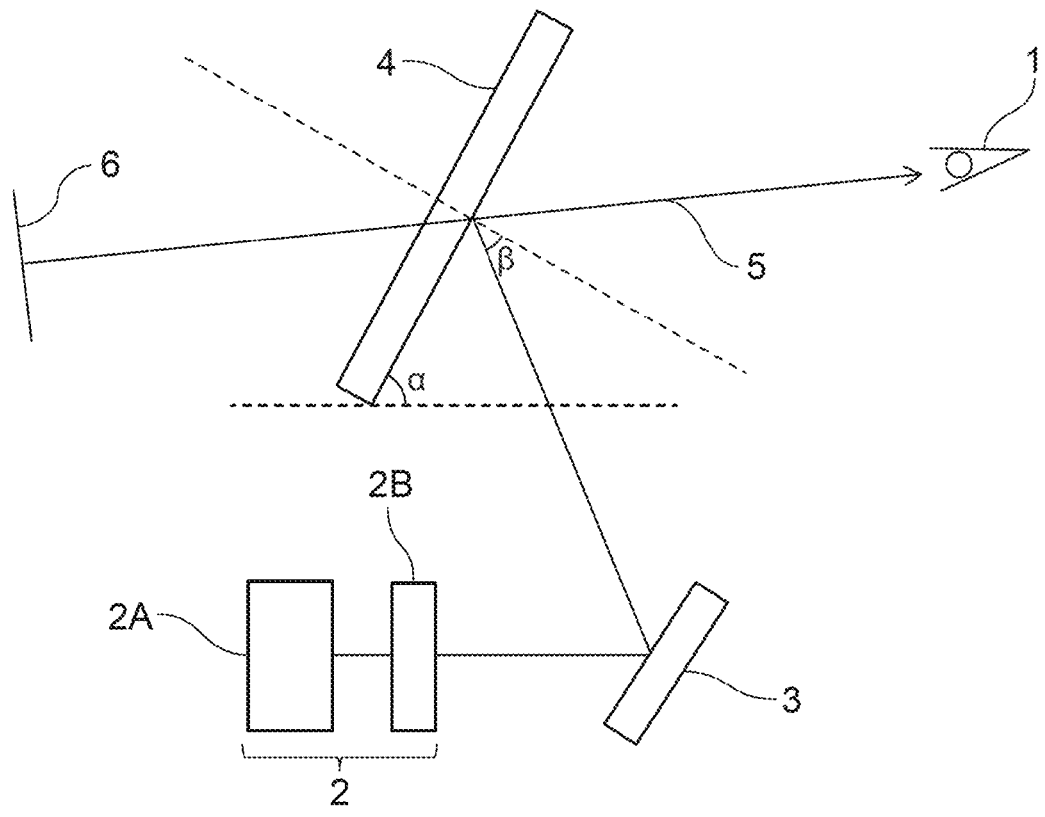
FIG. 2 is a schematic diagram showing another embodiment of a head-up display system according to the present disclosure.

It is preferable that the display light emitted from the image display unit be S polarized light or P polarized light. As long as such image display unit can emit desired P polarized light or S polarized light until the desired the P polarized light or the S polarized light finally reaches the functional glass, the image display unit is not particularly limited. The examples include liquid crystal displays (LCDs) and organic EL displays (OLEDs). When the image display unit is a liquid crystal display, emission light is usually linear polarized light, and can therefore be used as it is. Meanwhile, when the image display unit is an organic EL display, for example, the image display unit 2 may include a light source 2A and a polarizing plate 2B which can emit P polarized light or S polarized light as shown in FIG. 2. When the HUD system is used for a car, optical members such as a polarizing plate and a ½ wavelength plate are disposed on a light-emitting opening such as a dashboard, and the liquid crystal display and the organic EL display can also be adjusted so that P polarized light or S polarized light can be emitted from the image display unit. The light source used for the image display unit is not particularly limited, and a laser light source, an LED source, or the like can be used. The display image can be clarified more effectively by setting the central reflection wavelength of a phase difference element forming the optical functional layer so that the central reflection wavelength corresponds to the emission spectrum of the above-mentioned light source.

Reflecting Mirror

The HUD system of the present disclosure may include a reflecting mirror if needed. As long as the reflecting mirror can reflect the display light from the image display unit toward the functional glass, the reflecting mirror is not particularly limited. For example, the reflecting mirror includes a plane mirror, a concave mirror, or the like. When a concave mirror is used as the reflecting mirror, the concave mirror can also magnify the display light from the display at a predetermined magnifying power.

Optical Functional Layer

Figure 3:
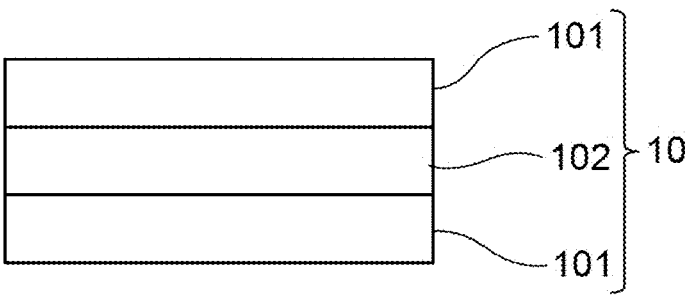
FIG. 3 is a schematic side sectional view showing an embodiment of an optical functional layer for a head-up display according to the present disclosure.

It is preferable that in the HUD system of the present disclosure, an optical functional layer included in the functional glass include at least one phase difference layer. It is preferable that the optical functional layer include two phase difference layers. FIG. 3 shows an embodiment of an optical functional layer included in the functional glass in the HUD system of the present disclosure (optical functional layer for the HUD system). Two phase difference layers 101 and an adhesive layer 102 adhering the phase difference layers 101 are stacked in an optical functional layer 10. In FIG. 3, the adhesive layer 102 is provided adjacent to the two phase difference layers 101. That is, the two phase difference layers 101 are laminated on both surfaces of the adhesive layer 102. When the adhesive layer 102 and the phase difference layers 101 are stacked, it is preferable that the supporting substrate described below be provided on the outside of the optical functional layer 10, that is, on the side of the phase difference layers 101 not contacting the adhesive layer 102.

It is preferable that the phase difference layer have a phase difference value of 200 nm or more and 350 nm or less. It is more preferable that the phase difference layer have a phase difference value of 220 nm or more and 300 nm or less. If the optical functional layer has a plurality of phase difference layers, the phase difference layers may have the same phase difference value or different phase difference values, and it is preferable that the optical functional layer include two phase difference layers having different phase difference values.

Phase Difference Layer

The phase difference layer(s) included in the optical functional layer has (have) the function of converting the polarization axis of incident light. Examples thereof include (A-1) a ½ wavelength plate, (A-2) a ¼ wavelength plate, (A-3) a laminate of a ½ wavelength plate and a circularly polarized light reflecting layer, (A-4) a laminate of a ¼ wavelength plate and a circularly polarized light reflecting layer, and (A-5) other layers having any phase difference. The phase difference layer includes at least one aspect of the above-mentioned (A-1) to (A-5). When the optical functional layer includes two phase difference layers, any aspect of the above-mentioned (A-1) to (A-5) or an aspect in which any aspects thereof are combined can be used as the phase difference layers. The aspects may be different or the same. When the optical functional layer has a plurality of phase difference layers, it is preferable that all the phase difference layers be (A-1) ½ wavelength plates, and it is more preferable that the optical functional layer have two phase difference layers, and both the phase difference layers be ½ wavelength plates. Two or more phase difference layers as a whole may function as a ½ wavelength plate. For example, the (A-1) to (A-5) may be combined into an optical functional layer the whole of which functions as a ½ wavelength plate for use.

½ Wavelength Plate

When the ½ wavelength plate is used as the phase difference layer, the ½ wavelength plate is a phase difference element having the function of converting P polarized light into S polarized light, or converting S polarized light into P polarized light, namely converting a polarization axis, and for example, can be obtained by monoaxially stretching a phase difference film including a polycarbonate or cycloolefin polymer so that phase difference is ½ of a wavelength or by orienting a horizontally oriented polymerizable liquid crystal at a thickness such that the phase difference is ½ of a wavelength. The ½ wavelength plate using a horizontally oriented polymerizable liquid crystal generally includes a polymerizable liquid crystal layer as a layer having the action of converting a polarization axis and a supporting substrate to be coated with a coating liquid which forms the polymerizable liquid crystal layer. The polymerizable liquid crystal layer can also be transferred to other base materials (for example, an intermediate film and a glass plate) for use. If the ½ wavelength plate includes two or more phase difference layers, it is preferable that each phase difference layer have one supporting substrate. It is preferable that the upper limit value of the thickness of such a ½ wavelength plate be 10 μm or less, and it is more preferable that the upper limit value be 5 μm or less from the viewpoint of the orientation of the liquid crystal. Meanwhile, it is preferable that the lower limit value of the thickness of a ½ wavelength plate be 0.3 μm or more, and it is more preferable that the lower limit value be 0.5 μm or more from the viewpoint of the polymerizability of the liquid crystal. When incident light comes into the main surface of the ½ wavelength plate from an oblique position, the phase difference may change depending on the incidence angle of light. In such a case, to adapt the phase difference more strictly, change in the phase difference accompanied with the incidence angle can be suppressed, for example, by using a phase difference element in which the refractive index of the phase difference element is adjusted. For example, when the refractive index in the direction of a slow axis in the surface of the phase difference element is defined as nx, the refractive index in the direction at right angles to nx in the surface of the phase difference element is defined as ny, and the refractive index in the thickness direction of the phase difference element is defined as nz, the coefficient Nz represented by the following Expression (1) is controlled to preferably 0.3 or more and 1.0 or less, more preferably 0.5 or more and 0.8 or less.

[Expression 1]

$$Nz = (nx - nz)/(nx - ny) \qquad (1)$$

When the ½ wavelength plate includes a polymerizable liquid crystal layer, a liquid crystal composition forming the polymerizable liquid crystal layer is applied to a supporting substrate. It is preferable that such a supporting substrate be transparent in a visible light region to maintain the visibility of a display image when the ½ wavelength plate is used for an HUD. The average transmittance of the visible light at a wavelength of 380 to 780 nm may be specifically 50% or more, it is preferable that the visible light transmittance be 70% or more, and it is more preferable that the visible light transmittance be 85% or more. Although the supporting substrate may be colored, it is preferable that the supporting substrate be not or hardly colored. Moreover, it is preferable that the refractive index of the supporting substrate be 1.2 to 2.0, and it is more preferable that the refractive index be 1.4 to 1.8. The thickness of the supporting substrate may be suitably selected depending on the use, and is preferably 5 μm or more and 1000 μm or less, more preferably 10 μm or more and 250 μm or less, and particularly preferably 15 μm or more and 150 μm or less.

The supporting substrate may be a monolayer, or may be a laminate having two or more layers. Example of the supporting substrate include triacetylcellulose (TAC), acryl, polycarbonate, polyvinyl chloride, polyolefin, and polyethylene terephthalate (PET). Among these, triacetylcellulose (TAC), polyolefin, acryl, and the like, which have little birefringence, are preferable. It is preferable that the phase difference value in an in-plane direction, Re, be 15 nm or less. It is further preferable that the phase difference value in an in-plane direction be 10 nm or less. It is preferable that the phase difference value in the thickness direction, Rth, be 60 nm or less. It is further preferable that the phase difference value in the thickness direction be 10 nm or less.

Thereafter, a method for manufacturing a ½ wavelength plate using the nematic liquid crystal monomer having the polymerizable group will be described. As such a method, for example, the nematic liquid crystal monomer having the polymerizable group is dissolved in a solvent, and a photopolymerization initiator is subsequently added. As long as the liquid crystal monomer to be used can be dissolved in such a solvent, such a solvent is not particularly limited. The examples include cyclopentanone, toluene, methyl ethyl ketone, methyl isobutyl ketone, and the like, and cyclopentanone, toluene and the like are preferable. Then, this solution is applied to a plastic substrate such as a PET film or a TAC film used as a supporting substrate so that the thickness is as uniform as possible, the solution is left to stand for a certain period of time under temperature conditions under which the solution becomes a liquid crystal, and is oriented on the supporting substrate while the solvent is removed by heating. At this time, the orientation of the liquid crystal can be more uniform by rubbing-treating the plastic substrate surface in a desired direction before the coating of the plastic substrate surface or by performing the orientation treatment of forming a photo-oriented material (hereinafter expressed as "coating liquid for an oriented film"), which exhibits photo-orientation by polarized light irradiation, into a film on the plastic film surface, irradiating polarized light, and the like. The slow axes of ½ wavelength plates can be controlled to desired angles, and the haze values of the ½ wavelength plates can be reduced thereby.

Subsequently, the ½ wavelength plate having a desired slow axis can be obtained by irradiating the nematic liquid crystal monomer with ultraviolet rays using a high-pressure mercury lamp or the like while this orientation state is maintained, and fixing the orientation of the liquid crystal.

The main role of the ½ wavelength plate is to convert S polarized light or P polarized light transmitted without being reflected on the surface into P polarized light or S polarized light. Reflection from the supporting substrate disposed outside can be reduced, and a double image is suppressed thereby.

If S polarized light comes into the functional glass 4 including the phase difference layer that is a ½ wavelength plate in the HUD systems shown in FIG. 1 and FIG. 2, light having come into the functional glass 4 at the Brewster angle β is partially reflected on the surface of the functional glass 4 as it is and visually confirmed by the observer 1. Meanwhile, incident light having passed through the functional glass 4 is converted into P polarized light inside by the ½ wavelength plate. Since the light is then emitted from the functional glass 4 into air on the interface with air at the Brewster angle, the reflection of the P polarized light is suppressed, so that a double image is less likely to be formed. Meanwhile, when the light coming into the functional glass 4 is P polarized light, the P polarized light is made to come into the functional glass 4 at the Brewster angle β, resulting in the suppression of the reflection thereof on the glass surface, so that a double image is less likely to be formed. Meanwhile, incident light having passed through the functional glass 4 is converted into S polarized light inside by the ½ wavelength plate. When the light is emitted from the functional glass 4 into air, the light is reflected on the interface with air and visually confirmed by the observer 1. As mentioned above, the use of the HUD system of the present disclosure suppresses the formation of a double image regardless of the type of polarized light coming into the functional glass 4, and enables providing a head-up display excellent in visibility.

¼ Wavelength Plate

A ¼ wavelength plate can also be used as a phase difference layer. The ¼ wavelength plate is a phase difference element having the function of converting circularly polarized light into linear polarized light, and, for example, can be obtained by monoaxially stretching a phase difference film including a polycarbonate or cycloolefin polymer so that the phase difference is ¼ of a wavelength or by orienting a horizontally oriented polymerizable liquid crystal at a thickness such that the phase difference is ¼ of a wavelength. Also, it is preferable that a polymerizable liquid crystal layer be included in the ¼ wavelength plate in the same way as the ½ wavelength plate. In such a case, the ¼ wavelength plate includes a polymerizable liquid crystal layer as a layer having the action of converting a polarization axis and a supporting substrate to be coated with a coating liquid which forms the polymerizable liquid crystal layer. The same materials as the nematic liquid crystal monomer and the supporting substrate to be used in the above-mentioned ½ wavelength plate can be used for the polymerizable liquid crystal layer and the supporting substrate.

When the deviation of the phase difference due to wavelength dispersion is large, a phase difference element called a broadband ¼ wavelength plate may be used as the ¼ wavelength plate. The broadband ¼ wavelength plate is a phase difference element in which the wavelength dependence of the phase difference is reduced. Examples include a phase difference element in which a ½ wavelength plate and a ¼ wavelength plate having the same wavelength dispersion are laminated so that an angle which the respective slow axes form is 60° and a polycarbonate-based phase difference element in which the wavelength dependence of the phase difference is reduced (manufactured by TEIJIN LIMITED: PURE-ACE WR-S). Moreover, when display light comes into the ¼ wavelength plate obliquely like a HUD, the phase difference may change with the incidence angle of light depending on the phase difference element. In such a case, as a method for matching the phase difference more strictly, for example, a change in the phase difference with the incidence angle can be suppressed by using a phase difference element in which the refractive index of the phase difference element is adjusted. As such an example, when the refractive index in the direction of the slow axis in the plane of the phase difference element is defined as nx, the refractive index in the direction perpendicular to nx in the plane of the phase difference element is defined as ny, and the refractive index in the thickness direction of the phase difference element is defined as nz, the coefficient Nz, which is represented by the above-mentioned Expression (1), is controlled to preferably 0.3 or more and 1.0 or less, more preferably 0.5 or more and 0.8 or less. It is preferable that the upper limit value of the thickness of the ¼ wavelength plate be 10 μm or less, and it is more preferable that the upper limit value be 5 μm or less from the viewpoint of the orientation of the liquid crystal. Meanwhile, it is preferable that the lower limit value of the thickness of the ¼ wavelength plate be 0.3 μm or more, and it is more preferable that the lower limit value be 0.5 μm or more.

It is preferable that the ½ wavelength plate or the ¼ wavelength plate for the phase difference layer include a polymerizable liquid crystal layer having a polymerizable liquid crystal compound. The polymerizable liquid crystal compound is a nematic liquid crystal monomer which has polymerizable groups in molecules, and exhibits liquid crystallinity in a certain temperature range or a certain concentration range. Examples of the polymerizable groups include a (meth)acryloyl group, a vinyl group, a chalconyl group, a cinnamoyl group, and an epoxy group. In order that the polymerizable liquid crystal exhibits liquid crystallinity, it is preferable that a mesogen group exist in a molecule. The mesogen group means a rod-like or plate-like substituent such as a biphenyl group, a terphenyl group, a (poly)phenyl benzoate ester group, a (poly)ether group, a benzylideneaniline group, or an acenaphthoquinoxaline group; or a disk-like substituent such as a triphenylene group, a phthalocyanine group, or an azacrown group, namely a group having the capability to induce liquid crystal phase behavior. A liquid crystal compound having a rod-like or plate-like substituent is known as a calamitic liquid crystal in the technical field. Examples of the nematic liquid crystal monomer having such polymerizable groups include polymerizable liquid crystals described in Japanese Patent Application Publication No. 2003-315556, Japanese Patent Application Publication No. 2004-29824, and the like; and polymerizable liquid crystals such as the PALIOCOLOR series (produced by BASF SE) and the RMM series (produced by Merck KGaA). Nematic liquid crystal monomers having these polymerizable groups may be used alone or as a mixture of two or more thereof.

A polymerizable compound which can react with a nematic liquid crystal monomer having polymerizable groups and does not have liquid crystallinity can also be added. Examples of such a compound include ultraviolet curable resins. Examples of the ultraviolet curable resins include dipentaerythritol hexa(meth)acrylate, the reaction product of dipentaerythritol penta(meth)acrylate and 1,6-hexamethylene diisocyanate, the reaction product of a triisocyanate having an isocyanuric ring and pentaerythritol tri(meth) acrylate, the reaction product of pentaerythritol tri(meth) acrylate and isophorone diisocyanate, dipentaerythritol penta(meth)acrylate, dipentaerythritol tetra(meth)acrylate, pentaerythritol tetra(meth)acrylate, pentaerythritol tri(meth) acrylate, trimethylolpropane tri(meth)acrylate, ditrimethylolpropane tetra(meth)acrylate, tris(acryloxyethyl) isocyanurate, tris(methacryloxyethyl) isocyanurate, the reaction product of glycerol triglycidyl ether and (meth)acrylic acid, caprolactone-modified tris(acryloxyethyl) isocyanurate, the reaction product of trimethylolpropane triglycidyl ether and (meth)acrylic acid, triglycerol di(meth)acrylate, the reaction product of propylene glycol diglycidyl ether and (meth) acrylic acid, polypropylene glycol di(meth)acrylate, tripropylene glycol di(meth)acrylate, polyethylene glycol di(meth)acrylate, tetraethylene glycol di(meth)acrylate, triethylene glycol di(meth)acrylate, pentaerythritol di(meth) acrylate, the reaction product of 1,6-hexanediol diglycidyl ether and (meth)acrylic acid, 1,6-hexanediol di(meth)acrylate, glycerol di(meth)acrylate, the reaction product of ethylene glycol diglycidyl ether and (meth)acrylic acid, the reaction product of diethylene glycol diglycidyl ether and (meth)acrylic acid, bis(acryloxyethyl)hydroxyethyl isocyanurate, bis(methacryloxyethyl)hydroxyethyl isocyanurate, the reaction product of bisphenol A diglycidyl ether and (meth)acrylic acid, tetrahydrofurfuryl (meth)acrylate, caprolactone-modified tetrahydrofurfuryl (meth)acrylate, 2-hydroxyethyl (meth)acrylate, 2-hydroxypropyl (meth)acrylate, polypropylene glycol (meth)acrylate, polyethylene glycol (meth)acrylate, phenoxyhydroxypropyl (meth)acrylate, acryloylmorpholine, methoxypolyethylene glycol (meth) acrylate, methoxytetraethylene glycol (meth)acrylate, methoxytriethylene glycol (meth)acrylate, methoxyethylene glycol (meth)acrylate, methoxyethyl (meth)acrylate, glycidyl (meth)acrylate, glycerol (meth)acrylate, ethylcarbitol (meth)acrylate, 2-ethoxyethyl (meth)acrylate, N,N-dimethylaminoethyl (meth)acrylate, 2-cyanoethyl(meth)acrylate, the reaction product of butyl glycidyl ether and (meth) acrylic acid, butoxytriethylene glycol(meth)acrylate, and butanediol mono(meth)acrylate. These may be used alone or as a mixture of two or more thereof. These ultraviolet curable resins not having liquid crystallinity have to be added to such an extent that the composition containing a nematic liquid crystal monomer does not lose liquid crystallinity, and the content of the ultraviolet curable resin is preferably 0.1 to 20 parts by mass, and more preferably 1.0 to 10 parts by mass based on 100 parts by mass of the nematic liquid crystal monomer having polymerizable groups.

When the nematic liquid crystal monomer having the above-mentioned polymerizable group and the polymerizable compound not having liquid crystallinity are ultraviolet curable, a photopolymerization initiator is added to cure a composition containing these by ultraviolet rays. Examples of the photopolymerization initiator include acetophenone-based compounds such as 2-methyl 1-[4-(methylthio)phenyl]-2-morpholinopropane-1 ("Omnirad 907", produced by IGM Resins B. V.), 1-hydroxycyclohexyl phenyl ketone ("Omnirad 184", produced by IGM Resins B. V.), 4-(2-hydroxyethoxy)-phenyl(2-hydroxy-2-propyl)ketone ("Omnirad 2959", produced by IGM Resins B. V.), 1-(4-dodecylphenyl)-2-hydroxy-2-methylpropan-1-one ("Darocur 953", produced by Merck KGaA), 1-(4-isopropylphenyl)-2-hydroxy-2-methylpropan-1-one ("Darocur 1116", produced by Merck KGaA), 2-hydroxy-2-methyl-1-phenylpropan-1-one ("Omnirad 1173", produced by IGM Resins B. V.), and diethoxyacetophenone; benzoin-based compounds such as benzoin, benzoin methyl ether, benzoin ethyl ether, benzoin isopropyl ether, benzoin isobutyl ether, and 2,2-dimethoxy-2-phenylacetophenone ("Irgacure 651", produced by BASF Japan Ltd.); benzophenone-based compounds such as benzoylbenzoic acid, methyl benzoylbenzoate, 4-phenylbenzophenone, hydroxybenzophenone, 4-benzoyl 4'-methyldiphenyl sulfide, and 3,3'-dimethyl-4-methoxybenzophenone ("Kayacure MBP", produced by Nippon Kayaku Co., Ltd.); and thioxanthone-based compounds such as thioxanthone, 2-chlorothioxanthone ("Kayacure CTX", produced by Nippon Kayaku Co., Ltd.), 2-methylthioxanthone, 2,4-dimethylthioxanthone ("Kayacure RTX", produced by Nippon Kayaku Co., Ltd.), isopropylthioxanthone, 2,4-dichlorothioxanthone ("Kayacure CTX", produced by Nippon Kayaku Co., Ltd.), 2,4-diethylthioxanthone ("Kayacure DETX", produced by Nippon Kayaku Co., Ltd.), and 2,4-diisopropylthioxanthone ("Kayacure DITX", produced by Nippon Kayaku Co., Ltd.). Preferable examples of the photopolymerization initiator include Irgacure OXE01, Irgacure OXE02, Irgacure OXE03, Irgacure OXE04 (all are produced by BASF Japan Ltd.), Omnirad TPO H, Omnirad 1300, Omnirad 184, Omnirad 369, Omnirad 379, Omnirad 819, Omnirad 127, Omnirad 907, and Omnirad 1173 (all are produced by IGM Resins B. V.), and more preferable examples include Omnirad TPO H, Irgacure OXE01, Irgacure OXE02, Omnirad 1300, and Omnirad 907. These photopolymerization initiators can be used singly or as a mixture obtained by mixing two or more at any ratio.

When the benzophenone-based compound or the thioxanthone-based compound is used as the photopolymerization initiator, an auxiliary agent can also be used in combination to promote photopolymerization reaction. Example of such an auxiliary agent include amine-based compounds such as triethanolamine, methyldiethanolamine, triisopropanolamine, n-butylamine, N-methyldiethanolamine, diethylaminoethyl methacrylate, Michler's ketone, 4,4'-diethylaminophenone, ethyl 4-dimethylaminobenzoate, (n-butoxy) ethyl 4-dimethylaminobenzoate, and isoamyl 4-dimethylaminobenzoate.

It is preferable that the amounts of the above-mentioned photopolymerization initiator and auxiliary agent added are such that the amounts thereof used do not affect the liquid crystallinity of the above-mentioned composition. The amounts thereof are preferably 0.5 parts by mass or more and 10 parts by mass or less, and more preferably 2 parts by mass or more and 8 parts by mass or less based on 100 parts by mass of the compound cured by ultraviolet rays in the composition. It is preferable that the amount of the auxiliary agent be 0.5 times or more and 2 times or less as many as the amount of the photopolymerization initiator.

In the case of use of a laminate of the ½ wavelength plate and a circularly polarized light reflecting layer or a laminate of the ¼ wavelength plate and a circularly polarized light reflecting layer as the phase difference layer, the ½ wavelength plate and the ¼ wavelength plate are as described above, and for example, a cholesteric liquid crystal layer using cholesteric liquid crystals is preferable as the circularly polarized light reflecting layer. It is preferable that the upper limit of the thickness of circularly polarized light reflecting layer be 10 μm or less, and it is more preferable that the upper limit be 5 μm or less from the viewpoint of the orientation of the cholesteric liquid crystals. Meanwhile, it is preferable that the lower limit of the thickness of the circularly polarized light reflecting layer be 0.3 μm or more, and it is more preferable that the upper limit be 0.5 μm or more from the viewpoint of the polymerizability of the cholesteric liquid crystals.

Adhesive Layer

When the phase difference layers are bonded through the adhesive layer, examples of adhesives for the adhesive layer include an acrylic or rubber-based adhesive. The acrylic adhesive, in which the adhesiveness, the holding power, and the like are easily adjusted, is preferable. Examples of the adhesive include ultraviolet curable resin compositions, thermosetting resin compositions, and mixtures thereof. In the case of an ultraviolet curable resin composition, the optical functional layers can be adhered by irradiating ultraviolet rays and curing the composition in which a plurality of monomers having acryloyl groups or epoxy groups is mixed in the presence of a photopolymerization initiator. In the case of a thermosetting resin composition, the optical functional layers can be adhered by heating and curing the composition in which a plurality of monomers having epoxy groups in the presence of an acid catalyst. Alternatively, the optical functional layers can be adhered by heating and curing a composition including a plurality of monomers or polymers having amino groups, carboxyl groups, and hydroxyl groups in the presence of a compound having isocyanate groups or melamine.

Since the optical functional layer included in the functional glass polarization-converts light accurately in a wide range in the visible light region in the HUD system of the present disclosure, the optical functional layer exhibits reverse wavelength dispersibility. Although polymers generally have the normal dispersion, in which the absolute value of the birefringence increases on the short wavelength side, reverse wavelength dispersibility is obtained in the case of a liquid crystal compound such that the birefringence increases on the long wavelength side by controlling the value of the birefringence $\Delta n$ at each wavelength of visible light. Reverse wavelength dispersibility is also obtained by laminating a plurality of phase difference layers in combination of suitable phase difference values and slow axes of the phase difference layers according to the wavelength dispersion characteristic of the liquid crystal compound. When the ½ wavelength plate is laminated as the phase difference layer as the combination of such a plurality of phase difference layers, with respect to the slow axis angles of the phase difference layers, the ½ wavelength plate can exhibit good polarization axis conversion performance in a wide wavelength range by appropriately controlling of the angle $\theta$ formed by the slow axis of the ½ wavelength plate and the polarization axis of the S polarized light or P polarized light coming in from a position oblique at 45° or more and 65° or less to an axis perpendicular to the surface of the functional glass including the optical functional layer. Consequently, the formation of a double image can be suppressed at wide angles of view, and the display image can be visually confirmed further clearly. In this case, it is particularly preferable from the viewpoint of the controllability of the slow axis of the ½ wavelength plate and production cost to use the ½ wavelength plate including a polymerizable liquid crystal layer as a layer having the action of converting the polarization axis.

It is desirable that the polarization conversion rate be high in the wavelength range from 380 nm to 780 nm, corresponding to the visible light region, as the polarization axis conversion performance, which is an index of reverse wavelength dispersibility. For example, it is preferable that the conversion rate of S polarized light or P polarized light coming in from a position oblique at 56° to the axis perpendicular to the surface of the functional glass including the optical functional layer, namely the conversion rate of S polarized light or P polarized light coming into the surface of the functional glass at the Brewster angle, be 80% or more at a wavelength of 450 nm and 710 nm and 95% or more at a wavelength of 580 nm. The conversion rate of the S polarized light or the P polarized light is more preferably 90% or more at a wavelength of 450 nm and 710 nm. It is preferable that the conversion rate be 97% or more at a wavelength of 580 nm.

If the optical functional layer includes two phase difference layers, it is preferable that the optical functional layer exhibit reverse wavelength dispersibility as a whole. As the aspects and the combinations of the phase difference values and the slow axis angles for obtaining reverse wavelength dispersibility exhibiting good polarization conversion properties in such a wide band in the two phase difference layers, it is preferable that, for example, the phase difference layers be ½ wavelength plates, and both have phase difference values at 200 nm or more and 350 nm or less.

As the combination of the slow axis angles in the two phase difference layers, it is preferable that (i) one phase difference layer has a slow axis angle of +15° or more and +35° or less, and the other phase difference layer has a slow axis angle of –80° or more and –60° or less or that (ii) one phase difference layer has a slow axis angle of –35° or more and –15° or less, and the other phase difference layer has a slow axis angle of +60° or more and +80° or less. More specifically, it is preferable that one phase difference layer has a positive slow axis angle, and the other phase difference layer has a negative slow axis angle. It is preferable that the sum of the absolute values of the slow axis angles which phase difference layers have be in the range of 90°±20°.

As the combination of the slow axis angles and the phase difference values in the two phase difference layers, it is moreover preferable that the one phase difference layer with a higher absolute value of the slow axis angle has a higher phase difference value than the other phase difference layer with a lower absolute value of the slow axis angle.

When the optical laminate includes two phase difference layers in the above-described aspects of the phase difference values and the slow axis angles and/or combination thereof, the polarization conversion properties are enhanced in the visible light region upon the incidence of light at an incidence angle of 56°, namely at the Brewster angle, to the surface of the functional glass. When display light emitted from the image display unit comes in from the side nearer to the phase difference layer having a higher phase difference value among the two phase difference layers in the HUD system of the present disclosure, the formation of a double image can be suppressed in an extended range.

It is preferable that, in the HUD system according to the present disclosure, light emitted from the image display unit come into the functional glass at an incidence angle αs a display medium in the range of β–10° to β+10°, assuming the Brewster angle at which S polarized light or P polarized light coming into the functional glass to be β. It is more preferable that the angle be in the range of β–5° to β+5°. The incidence angle means the angle formed by the axis perpendicular to the surface of the display medium (functional glass) and the light coming into the display medium (hereinafter, this incidence angle is also referred to as an "incidence angle, X").

When, in one embodiment of the HUD system of the present disclosure, a ½ wavelength plate is used as the phase difference layer included in the optical functional layer, a windshield as the display medium is the functional glass, and display light emitted from the image display unit is S polarized light, the reflection of the P polarized light into which the functional glass converts the S polarized light on the glass plate can be controlled on the outer side of a car by making the S polarized light emitted from the image display unit come in at an incidence angle in the range of β–10° to β+10°, namely at around the Brewster angle β, preferably at the Brewster angle β at the angle to the axis perpendicular to the surface of the functional glass, through the reflecting mirror 3. Consequently, the formation of a double image can be deterred. That is, when the incidence angle of the S polarized light is less than β–10° or more than β+10°, the incidence angle of the S polarized light is not near the Brewster angle, the reflection of the P polarized light into which the S polarized light is converted by the ½ wavelength plate therefore increases, and a double image may be formed.

When the optical functional layer includes two or more phase difference layers in an embodiment of the HUD system of the present disclosure, it is preferable that light be made to come in from the side to which the phase difference layer having the highest refractive index is disposed nearer. Although the reason therefor is however unknown, upon the incidence of the S polarized light into the functional glass under this condition, the angle of view is observed to be improved.

When, in another embodiment of the HUD system of the present disclosure, a laminate in which one or more circularly polarized light reflecting layers (cholesteric liquid crystal layers) is clamped with two ¼ wavelength plates is used as the optical functional layer, the windshield as the display medium is functional glass, and the display light emitted from the image display unit is P polarized light, a double image can also be suppressed in the same way. Since reflected light from the road surface is generally S polarized light, polarization sunglasses are designed to be able to absorb S polarized light. In a conventional HUD system using S polarized light, the visibility of the display image in the HUD through polarization sunglasses therefore decreases extremely. Meanwhile, in the case of the HUD system in which P polarized light reaches the observer and which uses P polarized light, the formation of a double image can be suppressed, and the visibility of the display image can be enhanced also when the polarization sunglasses are worn. When the circularly polarized light reflecting layer is a cholesteric liquid crystal layer, circularly polarized light transmitted through the circularly polarized light reflecting layer is converted into the original P polarized light by the second ¼ wavelength plate in which the slow axis is disposed so as to intersect at right angles to the slow axis of the first ¼ wavelength plate. The converted P polarized light comes into the glass surface on the outer side of the car and outside the second ¼ wavelength plate near the Brewster angle in the same way. Therefore, the reflection of the P polarized light on the glass surface on the outer side of the car and outside the second ¼ wavelength plate can also be reduced greatly, and the formation of a double image is consequently improved greatly.

When the optical functional layer including the ½ wavelength plate is provided in the HUD system of the present disclosure as the phase difference layer, it is preferable that the angle θ formed by the slow axis of the optical functional layer and the polarization axis of S polarized light or the polarization axis of P polarized light coming in from a position oblique at 45° or more and 65° or less to the axis perpendicular to the surface of the functional glass be controlled to 35° or more and 47° or less for efficient polarization conversion (for example, conversion of P polarized light into S polarized light or conversion of S polarized light into P polarized light). When P polarized light comes into the functional glass, the reflectance on the surface of the functional glass can be theoretically suppressed to 2% or less by adjusting the incidence angle of S polarized light or P polarized light which comes into the functional glass to the range of 45° or more and 65° or less. Transmitted P polarized light is converted into S polarized light with the ½ wavelength plate, and the converted S polarized light is reflected on the interface between the functional glass on the side opposite to the incidence side and air. The reflected S polarized light is converted into P polarized light with the ½ wavelength plate again, and this P polarized light reaches an observer. When S polarized light comes into the functional glass, the S polarized light is reflected on the surface of the functional glass, and this S polarized light reaches the observer. Some of the transmitted S polarized light is converted into P polarized light with the ½ wavelength plate, the converted P polarized light is not reflected on the functional glass on the side opposite to the incidence side or the interface between the functional glass and air, and passes. Thus, the formation of a double image can be suppressed by controlling the incidence angle X of S polarized light or P polarized light which comes into the functional glass. When the angle θ is less than 35° or more than 47°, the polarization axis conversion performance for converting P polarized light which comes into the functional glass into S polarized light or converting S polarized light which comes into the functional glass into P polarized light is low, and a double image may consequently be formed. The ½ wavelength plate exhibits good polarization axis conversion performance by controlling this angle θ appropriately, and the display image can be consequently visually confirmed more clearly.

It is preferable that the angle θ be a value calculated from the following Expressions (2) and (3) to appropriately control the polarization axis conversion performance when the optical functional layer includes a ½ wavelength plate as the phase difference layer. Here, the technical meaning of the following Expressions (2) and (3) will be described. When S polarized light or P polarized light which comes into the functional glass passes the ½ wavelength plate, which is a medium having a refractive index different from air, the incidence angle X at which the S polarized light or the P polarized light comes into the ½ wavelength plate changes. Here, when the incidence angle X which S polarized light or P polarized light forms with the functional glass is defined as A, the incidence angle X at which the S polarized light or the P polarized light actually comes into the ½ wavelength plate, namely the refraction angle of the ½ wavelength plate is defined as B, the refractive index of air is defined as $n_A$, and the refractive index of the ½ wavelength plate is defined as $n_B$, sin A/sin B=$n_B$/$n_A$ is valid according to Snell's law. When this expression is simplified to an equation in which B is found, Expression (3) is derived. Meanwhile, if a phase difference value when the polarization axis of S polarized light which comes into the functional glass is defined as the x-axis, the polarization axis of P polarized light is the y-axis, and an angle which the y-axis and the slow axis of the ½ wavelength plate form is defined as θ is Re, the y-axis is represented by Re·cos θ, and the x-axis is represented by Re·sin θ using vector analysis. Here, since it is known that the polarization axis conversion performance of the ½ wavelength plate is maximum when light comes in at 45° to the slow axis of the ½ wavelength plate, it is desirable that the angle θ which the polarization axis of S polarized light or the polarization axis of P polarized light and the slow axis of the optical functional layer form be theoretically 45°. However, as mentioned above, even though an angle which the polarization axis of S polarized light or P polarized light which comes into the functional glass and the slow axis of the ½ wavelength plate form is defined as θ, the angle at which the S polarized light or the P polarized light comes into the ½ wavelength plate is actually B. Then, when, as to the y-axis (theoretical y-axis) which is Re·cos θ, the y-axis inclined at an angle of B around the x-axis (actual y-axis) is found, Re·cos θ/actual y-axis=sin(90°−B) is valid, and the actual y-axis is represented by Re·cos θ cos B. As mentioned above, it is desirable that an angle which the slow axis of the ½ wavelength plate and the polarization axis of S polarized light or the polarization axis of P polarized light form be 45°. The x-axis (Re·sin θ) needs to be equal to the actual y-axis (Re·cos θ cos B) to adjust an angle which the polarization axis of the S polarized light or the P polarized light which comes into the functional glass and the slow axis of the ½ wavelength plate form to 45°. Therefore, Re·sin θ=Re·cos θ cos B is found, and Expression (2) is derived by simplifying this expression. Thus, the polarization axis conversion performance which the ½ wavelength plate exhibits can be utilized to the utmost by controlling the angle θ strictly using the relationship with the angle B at which the S polarized light or the P polarized light actually comes into the ½ wavelength plate based on a value calculated from the following Expressions (2) and (3).

[Expression 2]

$$\tan \theta = \cos B \tag{2}$$

$$B = \sin^{-1}\left(\sin A \cdot \frac{n_A}{n_B}\right) \tag{3}$$

θ: Angle which slow axis of ½ wavelength plate and polarization axis of S polarized light or P polarized light which comes in at any incidence angle of A to functional glass form A: Incidence angle of S polarized light or P polarized light to functional glass.

$n_A$: Refractive index of air $n_B$: Refractive index of ½ wavelength plate

It is preferable that the range of the angle θ be controlled to the range of the value of the angle θ±5°, and it is more preferable that the range of the angle θ be controlled to the range of the value of the angle θ±3°. When the angle θ is out of the range of an angle which satisfies a value calculated from Expressions (2) and (3)±5°, the polarization light conversion efficiency which the ½ wavelength plate exhibits may decrease. A decrease in the polarization light conversion efficiency with the ½ wavelength plate can be suppressed by controlling the range of the angle θ based on the value calculated from Expressions (2) and (3).

As the refractive index of the ½ wavelength plate substituted for expression (3), the refractive index in the direction of the slow axis of the ½ wavelength plate is defined as nx, the refractive index in the direction at right angles to the slow axis direction in which nx is obtained in the plane of the ½ wavelength plate is defined as ny, the refractive index in the thickness direction of the ½ wavelength plate is defined as nz, and a value obtained by averaging these is used as an average refractive index. When a ½ wavelength plate which is a commercial item is used, a value listed on a catalog or the like can also be used as the average refractive index. When the polymerizable liquid crystal described above is used as a material of the ½ wavelength plate, the average refractive index is represented by (nx+ ny+nz)/3=(no+no+ne)/3 using the original ordinary refractive index no and the extraordinary refractive index ne, of the liquid crystal. If specific examples of θ calculated from Expression (2) and (3) are given, for example, when the refractive index of air is defined as 1.00, a ½ wavelength plate having a refractive index of 1.55 is used, and the incidence angle X of S polarized light or P polarized light is 45°, the value of θ is 42° based on Expressions (2) and (3). Therefore, the range of θ is preferably 37° or more and 47° or less, and more preferably 39° or more and 45° or less. When the incidence angle X of S polarized light or P polarized light is 50°, the value of θ is 41° based on Expressions (2) and (3). Therefore, it is preferable that the range of θ be 36° or more and 46° or less, and it is more preferable that the range be 38° or more and 44° or less. When the incidence angle X of S polarized light or P polarized light is 56° or 60°, the value of θ is 40° based on Expressions (2) and (3). Therefore, it is preferable that the range of θ be 35° or more and 45° or less, and it is more preferable that the range be 37° or more and 43° or less. Furthermore, when the incidence angle X of S polarized light or P polarized light is 65°, the value of θ is 39° based on Expressions (2) and (3). Therefore, it is preferable that the range of θ be 34° or more and 44° or less, and it is more preferable that the range be 36° or more and 42° or less.

Intermediate Film

The functional glass described above may further include an intermediate film. That is, an optical laminate in which the intermediate film is further stacked on the optical functional layer (optical laminate for a HUD) can be used. It is preferable that the intermediate film be a resin film of a thermoplastic resin, and it is more preferable that the intermediate film be a film of polyvinyl butyral. Although the number of the intermediate film may be one or more, an optical laminate having a structure in which the optical functional layer was clamped by two intermediate films is preferable. Two different optical functional layers may be used for the optical laminate. In this case, it is preferable that the differences between slow axis angles in the same plane be the same in the two optical functional layers.

Figure 4:
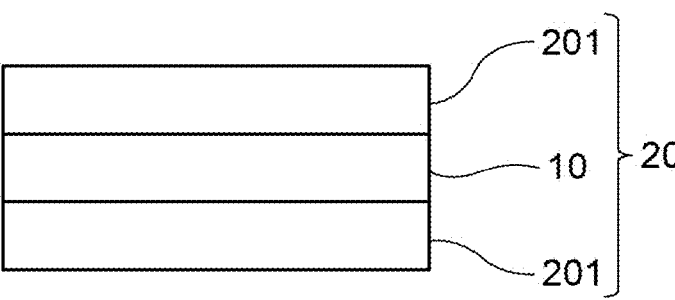
FIG. 4 is a schematic side sectional view showing an embodiment of an optical laminate including the optical functional layer shown in FIG. 3.

One embodiment of the optical laminate included in the functional glass in the HUD system of the present disclosure (optical laminate for a HUD) is shown in FIG. 4. An optical laminate 20 has a structure in which an optical functional layer 10 is clamped with two intermediate films 201. For example, the optical functional layer 10 corresponds to the optical functional layer shown in FIG. 3. Such an optical laminate 20 is manufactured by laminating the intermediate films 201 on the optical functional layer 10.

As the intermediate film, a thermoplastic resin can be used. It is preferable that a commonly used intermediate film for automotive application can be used. Examples of such the intermediate film for automotive application include polyvinyl butyral-based resins (PVBs), polyvinyl alcohol resins (PVAs), ethylene-vinyl acetate copolymer-based resin (EVAs), or cycloolefin polymers (COPs). Intermediate films manufactured from these resins are preferable due to being versatile as intermediate films for laminated glass. As long as the reflection of display light is not affected at the time of applying the optical laminate to the HUD system, the thickness of the intermediate film is not particularly limited, and can be suitably designed depending on the use.

An ultraviolet ray absorbent, an antioxidant, an antistatic agent, a heat stabilizer, a coloring agent, an adhesion control agent, and the like may be optionally added to the intermediate film, especially the intermediate film in which particulates which absorbs infrared rays are dispersed is important for manufacturing heat shielding laminated glass with high performance. Particulates of materials such as metals of Sn, Ti, Zn, Fe, Al, Co, Ce, Cs, In, Ni, Ag, Cu, Pt, Mn, Ta, W, V, and Mo, metal oxides of the metals, metal nitrides of the metals, or complexes containing at least two or more thereof, which have conductivity, are used for particulates which absorb infrared rays. These materials may be doped with Sn, Sb, F, or the like. When especially tin-doped indium oxide (ITO), antimony-doped tin oxide (ATO), and fluorine-doped tin oxide, which is transparent in the visible light region, are used as windows for construction or cars required for transparency, the materials are preferable. It is preferable that the particle size of the particulates which absorb infrared rays and are dispersed in the intermediate film be 0.2 μm or less. If the particle size of the particulates is 0.2 μm or less, infrared rays can be absorbed while the scattering of light in the visible light region, the physical properties such as adhesiveness, transparency, and durability are maintained equivalently to an unadded intermediate film without causing haze while the radio wave transmittance and the transparency are secured, and treatment for forming laminated glass can moreover be performed in operation in a common line for manufacturing laminated glass. When PVB is used for the intermediate film, lamination treatment is performed in a room at constant temperature and constant humidity to maintain the moisture content of the intermediate film optimally. An intermediate film, a part of which is colored, an intermediate film in which a layer having a sound insulation function is sandwiched, an intermediate film in which the thickness is oblique (wedge shape) to reduce the formation of a double image (a ghost phenomenon) in the HUD, or the like can be used for the intermediate film.

Although the method for laminating the above-mentioned intermediate film with the above-mentioned optical functional layer is not particularly limited, examples include a method for laminating an intermediate film with an optical functional layer by press-fitting simultaneously using a nip roll. When the nip roll can be heated at the time of lamination, the intermediate film and the optical functional layer can be press-fit during heating. When the adhesion between the intermediate film and the optical functional layer is inferior, the lamination may be performed after surface treatment by corona treatment, plasma treatment, or the like is performed beforehand.

The intermediate film may be directly layered on one surface or both surfaces of the optical functional layer with the intermediate film dissolved in a solvent. When a polyvinyl butyral-based resin (PVB) is used, it is preferable that the lower limit of the degree of butyralation be 40% by mol, it is more preferable that the lower limit be 55% by mol, and it is particularly preferable that the lower limit be 60% by mol. Meanwhile, it is preferable that the upper limit of the degree of butyralation be 85% by mol or more, it is more preferable that the upper limit be 80% by mol or more, and it is particularly preferable that the upper limit be 75% by mol or more. The degree of butyralation can be measured by an infrared absorption spectrum (IR) method, and for example, can be measured using an FT-IR.

It is preferable that the lower limit of the hydroxyl group amount of the polyvinyl butyral-based resin be 15% by mol, and it is preferable that the upper limit of the hydroxyl group amount of the polyvinyl butyral-based resin be 35% by mol. When the intermediate film containing hydroxyl groups in an amount of less than 15% by mol is bonded onto the glass plate described below to manufacture laminated glass, the adhesiveness between the intermediate film and the glass plate may decrease, or the penetration resistance of the laminated glass may decrease. Meanwhile, when the amount of hydroxyl groups exceeds 35% by mol, the intermediate film may be hard.

The polyvinyl butyral-based resin can be prepared by acetalizing polyvinyl alcohol with an aldehyde. Polyvinyl alcohol is usually obtained by saponifying polyvinyl acetate, and polyvinyl alcohol having a saponification degree of 80% by mol or more and 99.8% by mol or less is generally used. It is preferable that the upper limit of the polymerization degree of polyvinyl alcohol be 4000, it is more preferable that the upper limit be 3000, and it is particularly preferable that the upper limit be 2500. When the polymerization degree exceeds 4000, the manufacturing of the intermediate film may be difficult.

Glass Plate

The functional glass described above includes a glass plate. That is, the optical functional layer or the optical laminate described above is laminated on the glass plate in the functional glass for the HUD of the present disclosure (functional glass for the HUD). Although the glass plate may be one or more, functional glass having a structure in which the optical functional layer or the optical laminate described above is clamped with two glass plates is preferable. Such functional glass is suitably used as a display medium in the HUD system.

Figure 5:
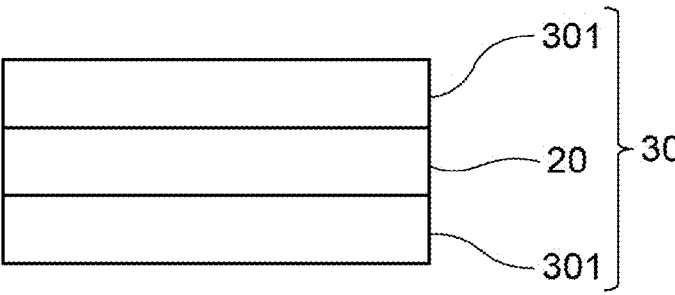
FIG. 5 is a schematic side sectional view showing an embodiment of functional glass including the optical laminate shown in FIG. 4.

When the functional glass is manufactured from the optical functional layer or the optical laminate described above, for example, the functional glass in which the optical functional layer or the optical laminate is disposed in laminated glass can be obtained by disposing the optical functional layer or the optical laminate between the two glass plates for press-fitting at high temperature and high pressure. FIG. 5 shows one embodiment of the functional glass for the HUD system of the present disclosure. Functional glass 30 shown in FIG. 5 has a structure in which an optical laminate 20 is clamped with two glass plates 301. For example, the optical laminate 20 corresponds to the optical laminate in FIG. 4, and the optical functional layer 10 is clamped with the two intermediate films 201. As shown in FIG. 5, when the glass plates 301 are laminated on the optical laminate 20, the intermediate films 201 also have the function as a pressure sensitive adhesive or an adhesive for maintaining the adhesion between the two glass plates 301 and the optical laminate 20.

The functional glass is manufactured, for example, by bonding the above-mentioned optical functional layer or optical laminate onto the glass plate. As one example of the method for bonding the optical functional layer or the optical laminate onto the glass plates, the functional glass can be obtained by applying a pressure sensitive adhesive or an adhesive to one side or both sides of the optical functional layer or the optical laminate and subsequently bonding the glass plate or the glass plates. Although the pressure sensitive adhesive or the adhesive is not particularly limited, when the removal may be performed, a material which is excellent in reworkability, and has good adhesiveness, for example, a silicone pressure sensitive adhesive, an acrylic pressure sensitive adhesive, or the like, is preferable.

For example, even though the functional glass for the HUD system of the present disclosure is used as a windshield, the glass plate is not particularly limited in the case where the functional glass has transparency wherein the scene ahead can be fully confirmed visually. It is preferable that the refractive index of the glass plate be 1.2 or more and 2.0 or less, and it is more preferable that the refractive index be 1.4 or more and 1.8 or less. It is particularly preferable that the refractive index be around 1.5. As long as the thickness, shape, and the like of the glass plate do not affect the reflection of display light, they are not particularly limited and can be suitably designed depending on the use. A reflection increasing film including a multilayer film and a metal thin film layer also having a heat shielding function may be provided on the reflective surface of the glass plate. These films can improve the reflectance of incident polarized light. For example, when the functional glass of the present disclosure is used as a windshield for cars, it is preferable to adjust the reflectance so that the visible light transmittance of the functional glass is 70% or more.

An example of the method of manufacturing functional glass using the optical functional layer or optical laminate will be described specifically. First, two glass plates are provided. When the glass plates are used as laminated glass for a windshield for a car, soda-lime glass made by the floating method is used. The glass may be either transparent glass and green-colored glass, and is not particularly limited. As to the thickness of these glass plates, around 2 mmt is usually employed; however, glass plates having a thickness a little thinner than this can also be used in response to requests for the weight reduction of glass in recent years. Glass plates are cut out in a predetermined shape, and the glass edges are chamfered off and washed. When a black print in a frame shape or a dot shape is required, this is printed on the glass plates. When a curved surface shape like a windshield is needed, the glass plates are heated at 650° C. or more and then faired by pressing with a mold, bending by self weight, or the like so that the two sheets may be in the same surface shape, and the glass plates is cooled. When the cooling rate is too high at this time, stress distribution occurs in the glass plates, the glass plates become tempered glass, and the glass plates are therefore slowly cooled. One of the thus manufactured glass plates is placed horizontally, and an optical functional layer or an optical laminate is laid thereon, and the other glass plate is further placed. Subsequently, the optical functional layer and the intermediate films protruded from the edges of the glass plates are cut and removed with a cutter. Then, heating is performed at a temperature of 80° C. to 100° C. while air existing between the glass plates and the optical functional layer or the optical laminate laminated in the shape of a sandwich is deaerated, and preliminary adhesion is performed. As methods for deaerating air, there are two types which are the bag method, which are performed by wrapping the laminate of glass plate/optical functional layer or optical laminate/glass plate in a rubber bag made of heat-resistant rubber or the like, and the ring method, in which sealing is performed by covering only the end portion of the glass plates with a rubber ring, and either may be used. After the completion of the preliminary adhesion, the laminate of glass plate/optical functional layer or optical laminate/glass plate taken out of the rubber bag or the laminate from which the rubber ring is removed is placed in an autoclave, heated to 120° C. to 150° C. under a high pressure of 10 to 15 kg/cm², and subjected to heating and pressurization treatment for 20 minutes to 40 minutes under these conditions. After the treatment, the laminate is cooled to 50° C. or less and then decompressed. Functional glass of the present disclosure having a laminate structure of glass plate/optical functional layer or optical laminate/glass plate is taken out of the autoclave.

The thus obtained functional glass can be used as windshields, side glasses, rear glasses, and roof glasses for various cars such as standard-sized cars, small cars, light cars, large-sized special cars and small special cars. Moreover, the functional glass can be used as windows for railcars, vessels, airplanes and as window materials for building materials and industrial uses. As a form of use, the functional glass can be used with the functional glass laminated onto or bonded onto members having a UV-blocking or a light control function.

The present disclosure relates to the following [1] to based on the above-mentioned embodiments.

[1] A head-up display system, including image display unit that emits display light showing a display image, and functional glass on which the image cast from the image display unit is projected, wherein the functional glass includes an optical functional layer exhibiting reverse wavelength dispersibility, the functional glass is disposed at an angle α of 20° or more and 70° or less, and a reflected image is visually confirmed within visual angles of Brewster angle β−(90°−the angle α)±15° to the functional glass.

[2] The head-up display system according to [1], wherein the functional glass is disposed at an angle α of 25° or more and 70° or less, and the reflected image is visually confirmed within visual angles of Brewster angle β−(90°−the angle α)±10° to the functional glass.

[3] The head-up display system according to [1] or [2], wherein the optical functional layer includes at least one phase difference layer.

[4] The head-up display system according to [3], wherein the optical functional layer includes two phase difference layers, and the optical functional layer as a whole exhibits reverse wavelength dispersibility.

[5] The head-up display system according to [3] or [4], wherein the phase difference layer has a phase difference value of 200 nm or more and 350 nm or less.

[6] The head-up display system according to any one of [3] to [5], wherein the optical functional layer includes two phase difference layers, and (i) one phase difference layer has a slow axis angle of +15° or more and +35° or less, and the other phase difference layer has a slow axis angle of −80° or more and −60° or less; or (ii) one phase difference layer has a slow axis angle of −35° or more and −15° or less, and the other phase difference layer has a slow axis angle of +60° or more and +80° or less.

[7] The head-up display system according to any one of [3] to [6], wherein the optical functional layer includes two phase difference layers, and among the two phase difference layers, one phase difference layer with a higher absolute value of a slow axis angle has a higher phase difference value than the other phase difference layer with a lower absolute value of a slow axis angle.

[8] The head-up display system according to any one of [3] to [7], wherein the optical functional layer includes two phase difference layers, and both phase difference layers are ½ wavelength plates.

[9] The head-up display system according to any one of [3] to [8], wherein the optical functional layer includes two phase difference layers, and the display light emitted from the image display unit comes in from the side nearer to the phase difference layer having the higher phase difference value among the two phase difference layers.

[10] The head-up display system according to any one of [1] to [9], wherein the functional glass further includes an intermediate film.

[11] The head-up display system according to any one of [1] to [10], wherein the functional glass includes a glass plate.

[12] The head-up display system according to any one of [1] to [11], wherein the display light emitted from the image display unit is S polarized light or P polarized light.

[13] An optical functional layer for a head-up display system to be provided in the head-up display system according to any one of [1] to [12].

EXAMPLES

Hereinafter, the present disclosure will be described in detail with Examples. In the Examples, "part" means "part by mass". As long as the present disclosure does not exceed the gist, the present disclosure is not limited to the following Examples. Unless otherwise specified, room temperature is in the range of 20° C.±5° C.

Example 1

<Preparation of Coating Liquid (Liquid Crystal Composition)>

A coating liquid A, having the composition shown in Table 1, was adjusted.

TABLE 1

| Raw material (type) | Material name (maker name) | Prescribed amount (part) |
| --- | --- | --- |
| Polymerizable liquid crystal | LC242 (BASF SE) | 25 |
| Photopolymerization initiator | Omnirad 907 (IGM Resins B. V.) | 1 |
| Solvent | Toluene | 74 |

<Manufacturing of Optical Functional Layer>

Two ½ wavelength plates were manufactured from the prepared coating liquid A in the following procedure. A TAC film ("P960", manufactured by TacBright Optronics Corporation, thickness: 60 μm) rubbing-treated in the method described in Example 1 of Japanese Patent Application Laid-Open No. 2002-90743 was used as a supporting substrate. The rubbing angles were set so that the longitudinal directions of the films form angles of −70° and 26° with the slow axes of the ½ wavelength plates, respectively (hereinafter also referred to as a "slow axis angle").

(i) The coating liquid A was applied to the rubbing-treated surface of the TAC film with a wire bar at room temperature so that the ½ wavelength plates obtained after drying have a thickness of around 2 μm.

(ii) The obtained coating films were heated at 50° C. for 2 minutes, and the solvent was removed to form liquid crystal phases. Subsequently, the liquid crystal phases were irradiated with UV using a high-pressure mercury lamp (manufactured by HARISON TOSHIBA LIGHTING Corporation) at a generating power of 120 W for 5 to 10 seconds to fix the liquid crystal phases, resulting in laminating the polymerizable liquid crystal layers on the TAC films for manufacturing the ½ wavelength plates. The phase difference values of the ½ wavelength plates were measured with an automatic birefringence meter ("KOBRA-21ADH", manufactured by Oji Scientific Instruments Co., Ltd.) to obtain two types of ½ wavelength plates, R1 and R2, having phase difference values at 546 nm of 293 nm (slow axis angle: −70°) and 230 nm (slow axis angle: 26°), respectively.

(iii) The polymerizable liquid crystal layers of the ½ wavelength plate R1 and the ½ wavelength plate R2, manufactured in the above-mentioned (i) to (ii), were laminated using an acrylic pressure sensitive adhesive ("SK Dyne 906", produced by Soken Chemical & Engineering Co., Ltd.) with the longitudinal directions of the ½ wavelength plates aligned to manufacture an optical functional layer.

The obtained ½ wavelength plates had an average transmittance of around 79% in the visible light wavelength region in the front direction thereof (incidence angle: 56°). The polarization conversion rate was 96.8% at a wavelength of 450 nm, 99% at 580 nm, 92.5% at 710 nm. The transmittances were measured using the "ultraviolet, visible, and near-infrared spectrophotometer UV-3600" manufactured by SHIMADZU CORPORATION with the optical laminate set between polarizing plates disposed parallel so that the incidence angle was 56°. The transmittances at wavelengths were subtracted from 100 to find values, which were defined as the polarization conversion rates.

<Manufacturing of Optical Laminate>

Transparent polyvinyl butyral intermediate films containing triethylene glycol di-2-ethylhexanoate as a plasticizer (thickness: 0.38 mm) were manufactured. The manufactured intermediate films were cut out to the same size as the optical functional layer in which the ½ wavelength plate R1 and the ½ wavelength plate R2 were laminated. The optical functional layer was disposed between the two polyvinyl butyral intermediate films. These were pressurized and press-fit with a laminator to manufacture an optical laminate.

<Manufacturing of Functional Glass>

The optical laminate was disposed between two glass plates each having the same size as the manufactured optical laminate and a thickness of 2 mm, and pressurization and heating are subsequently performed to manufacture functional glass. Specifically, first, the above-mentioned optical laminate and a transparent glass plate were laid on a transparent glass plate sequentially. This was wrapped in a rubber bag, deaerated in an autoclave heated at 90° C. for 10 minutes, and subjected to preliminary adhesion. This was cooled to room temperature, and this was then taken out of the rubber bag, and heated and pressurized in the autoclave at 135° C. under a high pressure of 12 kg/cm² for 30 minutes again. Functional glass which had good appearance and in which the optical laminate was inserted was manufactured. The obtained functional glass had an average transmittance of around 72% in the visible light wavelength region in the front direction thereof (incidence angle: 56°). The polarization conversion rate was 96.8% at a wavelength of 450 nm, 99% at 580 nm, 92.5% at 710 nm. The transmittance was measured using the "ultraviolet, visible, and near-infrared spectrophotometer UV-3600" manufactured by SHIMADZU CORPORATION with the functional glass set between polarizing plates disposed parallel so that the incidence angle was 56°. The transmittances at wavelengths were subtracted from 100 to find values, which were defined as the polarization conversion rates.

<Manufacturing of Head-Up Display and Evaluation of Display Image>

A head-up display was manufactured in the disposition as shown in FIG. 1. As the image display unit 2 and the reflecting mirror 3, a liquid crystal display panel which was able to emit S polarized light to the functional glass 4 was installed. As the functional glass 4, the functional glass manufactured above was used. The functional glass was disposed and adjusted so that in a darkroom, the functional glass 4 was disposed at an angle, α, of 34°, and S polarized light emitted from the image display unit 2 came into the functional glass 4 at an incidence angle, X, that is the Brewster angle β (around) 56°. The reflected image was visually confirmed at visual angles of the Brewster angle β(56°)–(90°–34°)±10°=0°+10°, namely 0°, 10°, and −10° to the functional glass 4. If the visual angle is positive, the visual angle is an angle of depression. If the visual angle is negative, the visual angle is an angle of elevation. The glass plate nearer to the ½ wavelength plate R1, having a phase difference value of 293 nm, was disposed on the side nearer to the image display unit 2. Upon the projection of an image, the display image was projected brightly and clearly. At this time, the eyesight from the point of view for observing the display image was moved in the up-down direction (vertically) and in the left-right direction (horizontally), and the range of the visual angle at which the display image was clearly projected was recorded as the angle of view. If the formation of a double image was suppressed at an angle of view within 10° in the up-down direction and at an angle of view within 30° in the left-right direction, the formation of a double image was able to be suppressed in a very wide range, and the disposition was rated "Excellent". If the formation of a double image was suppressed at an angle of view within 6° in the up-down direction and at an angle of view within 30° in the left-right direction, the formation of a double image was able to be suppressed in a wide range, and the disposition was rated "Good". If the formation of a double image was not able to be suppressed within the above-mentioned angles of view, that is, in the case of an insufficient effect of suppressing a double image, the disposition was rated "Poor". The results were shown in Table 2.

Example 2

An optical functional layer, an optical laminate, and functional glass were manufactured in the same way as in Example 1 except that the functional glass was disposed at an angle, α, of 29° so that the reflected image was visually confirmed and photographed at visual angles of (56°)–(90°–29°)±10°=−5°±10°, namely −5°, 5°, and −15°. The display image was evaluated with the obtained functional glass in the same way. The results were shown in Table 2.

Example 3

An optical functional layer, an optical laminate, and functional glass were manufactured in the same way as in Example 1 except that the functional glass was disposed at an angle, α, of 39° so that the reflected image was visually confirmed and photographed at visual angles of (56°)–(90°–39°)±10°=−5°±10°, namely 5°, 15°, and −5°. The display image was evaluated with the obtained functional glass in the same way. The results were shown in Table 2.

Example 4

An optical functional layer, an optical laminate, and functional glass were manufactured in the same way as in Example 1 except that the functional glass was disposed at an angle α of 25° so that the reflected image was visually confirmed and photographed at visual angles of (56°)–(90°–25°)=–9°, –9°+15°, namely –9° and 6°. The display image was evaluated with the obtained functional glass in the same way. The results were shown in Table 2.

Example 5

An optical functional layer, an optical laminate, and functional glass were manufactured in the same way as in Example 1 except that the functional glass was disposed at an angle, α, of 70° so that the reflected image was visually confirmed and photographed at a visual angle of (56°)–(90°–70°)=36°. The display image was evaluated with the obtained functional glass in the same way. The results were shown in Table 2.

Example 6

An optical functional layer, an optical laminate, and functional glass were manufactured in the same way as in Example 1 except that the functional glass was disposed at an angle, α, of 34° so that the reflected image was visually confirmed and photographed at visual angles of (56°)–(90°–34°)±15°=15° and –15°. The display image was evaluated with the obtained functional glass in the same way. The results were shown in Table 2.

Example 7

An optical functional layer, an optical laminate, and functional glass were manufactured in the same way as in Example 1 except that the functional glass was disposed at an angle α of 20° so that the reflected image was visually confirmed and photographed at visual angles of (56°)–(90°–20°)=–14° and –14°+15°, namely –14° and 1°. The display image was evaluated with the obtained functional glass in the same way. The results were shown in Table 2.

Example 8

An optical functional layer, an optical laminate, and functional glass were manufactured in the same way as in Example 1 except that the functional glass was disposed at an angle, α, of 44° so that the reflected image was visually confirmed and photographed at a visual angle of (56°)–(90°–44°)=10°–10°, namely 0°. The display image was evaluated with the obtained functional glass in the same way. The results were shown in Table 2.

Example 9

An optical functional layer, an optical laminate, and functional glass were manufactured in the same way as in Example 1 except that the functional glass was disposed at an angle, α, of 50° so that the reflected image was visually confirmed and photographed at a visual angle of (56°)–(90°–50°)=16°–15°, namely 1°. The display image was evaluated with the obtained functional glass in the same way. The results were shown in Table 2.

Comparative Example 1

An optical functional layer, an optical laminate, and functional glass were manufactured in the same way as in Example 1 except that the functional glass was disposed at an angle, α, of 75° so that the reflected image was visually confirmed and photographed at a visual angle of (56°)–(90°–75°)=41°. The display image was evaluated with the obtained functional glass in the same way. The results were shown in Table 2.

[Example 10] to [Example 15] and [Comparative Example 2] to [Comparative Example 6]

Each optical functional layer, each optical laminate, and each functional glass were manufactured in the same way as in Example 1 except that the optical functional layer was manufactured in combination of two types of ½ wavelength plates, R1 and R2, having slow axis angles and phase difference values shown in Table 2. The polarization conversion rate and the display image were measured and evaluated with the obtained functional glass in the same way. The results were shown in Table 2.

TABLE 2

| | ½ wavelength plate R1 | | ½ wavelength plate R2 | | Func- | Visual | Polarization conversion rate at incidence angle of 56° | | | Reverse wavelength dispersibility at incidence angle of 56° The polarization conversion rate is 90% or more at three wavelengths, and the | Evaluation item |
|---|---|---|---|---|---|---|---|---|---|---|---|
| | Slow axis angle [°] | Phase difference value [nm] | Slow axis angle [°] | Phase difference value [nm] | tional glass Angle α [°] | angle Angle [°] | 450 nm [%] | 580 nm [%] | 710 nm [%] | polarization conversion rate at 580 nm is 97% or more. | Display image |
| Example 1 | –70 | 293 | 26 | 230 | 34 | 0 | 96.8 | 99 | 92.5 | Good | Excellent |
| | | | | | | 10 | | | | | Excellent |
| | | | | | | –10 | | | | | Excellent |
| Example 2 | | | | | 29 | –5 | | | | | Excellent |
| | | | | | | 5 | | | | | Excellent |
| | | | | | | –15 | | | | | Excellent |
| Example 3 | | | | | 39 | 5 | | | | | Excellent |
| | | | | | | 15 | | | | | Excellent |
| | | | | | | –5 | | | | | Excellent |
| Example 4 | | | | | 25 | –9 | | | | | Excellent |
| | | | | | | 3 | | | | | Excellent |
| Example 5 | | | | | 70 | 36 | | | | | Excellent |
| Example 6 | | | | | 34 | 15 | | | | | Good |
| | | | | | | –15 | | | | | Good |

TABLE 2-continued

| | ½ wavelength plate R1 | | ½ wavelength plate R2 | | Func- | Visual | Polarization conversion rate at incidence angle of 56° | | | Reverse wavelength dispersibility at incidence angle of 56° The polarization conversion rate is 90% or more at three wavelengths, and the | Evaluation item |
|---|---|---|---|---|---|---|---|---|---|---|---|
| | Slow axis | Phase difference | Slow axis | Phase difference | tional glass | angle | | | | | |
| | angle [°] | value [nm] | angle [°] | value [nm] | Angle α [°] | Angle [°] | 450 nm [%] | 580 nm [%] | 710 nm [%] | polarization conversion rate at 580 nm is 97% or more. | Display image |
| Example 7 | | | | | 20 | −14 | | | | | Excellent |
| | | | | | | 1 | | | | | Good |
| Example 8 | | | | | 44 | 0 | | | | | Excellent |
| Example 9 | | | | | 50 | 1 | | | | | Good |
| Comparative Example 1 | | | | | 75 | 41 | | | | | Poor |
| Example 10 | −67.5 | 293 | 22.5 | 230 | 34 | 0 | 95.5 | 99.5 | 97.3 | Good | Excellent |
| Example 11 | −67.5 | 275 | 22.5 | 230 | 34 | 0 | 92.1 | 98.8 | 93.9 | Good | Excellent |
| Example 12 | −73.5 | 275 | 30 | 230 | 34 | 0 | 91.4 | 98.6 | 96.7 | Good | Excellent |
| Example 13 | −71.5 | 293 | 26.5 | 254 | 34 | 0 | 93.5 | 99.2 | 94.4 | Good | Excellent |
| Example 14 | −67.5 | 341 | 22.5 | 291 | 34 | 0 | 90.5 | 99.7 | 97 | Good | Excellent |
| Example 15 | −75 | 341 | 30 | 271 | 34 | 0 | 91.4 | 99.6 | 95.6 | Good | Excellent |
| Comparative Example 2 | −60 | 235 | 16.5 | 275 | 34 | 0 | 74.2 | 78.3 | 90.4 | Poor | Poor |
| Comparative Example 3 | −67.5 | 230 | 22.5 | 275 | 34 | 0 | 78 | 76.6 | 72.5 | Poor | Poor |
| Comparative Example 4 | −67.5 | 275 | 22.5 | 275 | 34 | 0 | 94.4 | 94.8 | 95.1 | Poor | Poor |
| Comparative Example 5 | −67.5 | 240 | 22.5 | 300 | 34 | 0 | 83.6 | 80 | 75.8 | Poor | Poor |
| Comparative Example 6 | −67.5 | 260 | 22.5 | 300 | 34 | 0 | 85.5 | 77.7 | 90.7 | Poor | Poor |

The comparison of Examples 1 to 9 with Comparative Example 1 based on the results in Table 2 has confirmed that if the functional glass including the optical functional layer as a whole exhibiting reverse wavelength dispersibility is disposed at an angle α of 25 to 70°, a HUD system can be provided which enables suppressing the formation of a double image in a wide range, and achieves satisfactory visibility. The comparison of Examples 10 to 15 with Comparative Examples 2 to 6 has confirmed that a HUD system which enables suppressing the formation of a double image in a wide range, and achieves satisfactory visibility can be provided using the functional glass including the optical functional layer as a whole exhibiting reverse wavelength dispersibility in combination of the phase difference values and the slow axis angles of the two phase difference layers (the ½ wavelength plate R1 and the ½ wavelength plate R2).

Since a head-up display system according to the present disclosure enables suppressing the formation of a double image effectively, the application of respective optimal visual angles at angles of various windshields enables suppressing the formation of double images effectively even in various types of cars, and consequently enables viewers to use the head-up display system within a wide angle of view without stress.

What is claimed is:

1. A head-up display system comprising:
image display unit that emits display light showing a display image; and
functional glass on which the image cast from the image display unit is projected,
wherein the functional glass comprises an optical functional layer exhibiting reverse wavelength dispersibility,
the functional glass is disposed at an angle α of 20° or more and 70° or less, a reflected image is visually confirmed within visual angles of Brewster angle β−(90°−the angle α)±15° to the functional glass,
the optical functional layer comprises two phase difference layers, and
among the two phase difference layers, one phase difference layer with a higher absolute value of a slow axis angle has a higher phase difference value than the other phase difference layer with a lower absolute value of a slow axis angle.

2. The head-up display system according to claim 1, wherein the functional glass is disposed at an angle α of 25° or more and 70° or less, and
the reflected image is visually confirmed within visual angles of Brewster angle β (90°−the angle α)±10° to the functional glass.

3. The head-up display system according to claim 2, wherein the optical functional layer as a whole exhibits reverse wavelength dispersibility.

4. The head-up display system according to claim 1, wherein the phase difference layers haves a phase difference value of 200 nm or more and 350 nm or less.

5. The head-up display system according to claim 1, wherein
(i) one phase difference layer has a slow axis angle of +15° or more and +35° or less, and the other phase difference layer has a slow axis angle of −80° or more and −60° or less; or
(ii) one phase difference layer has a slow axis angle of −35° or more and −15° or less, and the other phase difference layer has a slow axis angle of +60° or more and +80° or less.

6. The head-up display system according to claim 1, wherein both phase difference layers are ½ wavelength plates.

7. The head-up display system according to claim 1, wherein the functional glass further comprises an intermediate film.

8. The head-up display system according to a claim 1, wherein the functional glass comprises a glass plate.

9. The head-up display system according to claim 1, wherein the display light emitted from the image display unit is S polarized light or P polarized light.

10. An optical functional layer for a head-up display system to be provided in the head-up display system according to claim 1.

11. A head-up display system comprising:

image display unit that emits display light showing a display image; and functional glass on which the image cast from the image display unit is projected, wherein the functional glass comprises an optical functional layer exhibiting reverse wavelength dispersibility, the functional glass is disposed at an angle α of 20° or more and 70° or less, a reflected image is visually confirmed within visual angles of Brewster angle β−(90°−the angle α)±15° to the functional glass, the optical functional layer comprises two phase difference layers, and the display light emitted from the image display unit comes in from the side nearer to the phase difference layer having a higher phase difference value among the two phase difference layers.

12. The head-up display system according to claim 11, wherein (i) one phase difference layer has a slow axis angle of +15° or more and +35° or less, and the other phase difference layer has a slow axis angle of −80° or more and −60° or less; or (ii) one phase difference layer has a slow axis angle of −35° or more and −15° or less, and the other phase difference layer has a slow axis angle of +60° or more and +80° or less.

13. The head-up display system according to claim 11, wherein the functional glass further comprises an intermediate film.

14. The head-up display system according to a claim 11, wherein the functional glass comprises a glass plate.

15. The head-up display system according to claim 11, wherein the display light emitted from the image display unit is S polarized light or P polarized light.

16. An optical functional layer for a head-up display system to be provided in the head-up display system according to claim 11.

* * * * *